United States Patent
Shi et al.

(10) Patent No.: US 12,242,829 B2
(45) Date of Patent: Mar. 4, 2025

(54) SYSTEMS AND METHODS FOR SOURCE CODE UNDERSTANDING USING SPATIAL REPRESENTATIONS

(71) Applicant: JPMORGAN CHASE BANK, N.A., New York, NY (US)

(72) Inventors: Ruibo Shi, London (GB); Sean Moran, London (GB); Lili Tao, Bristol (GB); Fanny Silavong, London (GB); Rohan Saphal, Glasgow (GB)

(73) Assignee: JPMORGAN CHASE BANK, N.A., New York, NY (US)

( * ) Notice: Subject to any disclaimer, the term of this patent is extended or adjusted under 35 U.S.C. 154(b) by 113 days.

(21) Appl. No.: 18/055,182

(22) Filed: Nov. 14, 2022

(65) Prior Publication Data
US 2023/0153085 A1 May 18, 2023

Related U.S. Application Data

(60) Provisional application No. 63/279,562, filed on Nov. 15, 2021.

(51) Int. Cl.
*G06F 9/44* (2018.01)
*G06F 8/41* (2018.01)
*G06N 20/00* (2019.01)

(52) U.S. Cl.
CPC .............. *G06F 8/41* (2013.01); *G06N 20/00* (2019.01)

(58) Field of Classification Search
None
See application file for complete search history.

(56) References Cited

U.S. PATENT DOCUMENTS

| | | | |
|---|---|---|---|
| 6,421,680 B1* | 7/2002 | Kumhyr | G06F 16/951 |
| 11,461,081 B2* | 10/2022 | Zhang | G06F 8/36 |
| 11,573,885 B1* | 2/2023 | Eizenman | G06N 3/0464 |
| 2019/0387259 A1* | 12/2019 | Coban | H04N 19/184 |
| 2021/0026605 A1* | 1/2021 | Evangelopoulos | G06N 3/084 |

(Continued)

OTHER PUBLICATIONS

International Search Report and Written Opinion of the International Searching Authority dated Mar. 20, 2023, from corresponding International Application No. PCT/US2022/079886.

(Continued)

*Primary Examiner* — Qamrun Nahar
(74) *Attorney, Agent, or Firm* — GREENBERG TRAURIG LLP

(57) ABSTRACT

Systems and methods for source code understanding using spatial representations are disclosed. In one embodiment, a method may include: (1) receiving, by a source code understanding computer program, a source code snippet; (2) converting, by the source code understanding computer program, the source code snippet to a two-dimensional image representation using an encoding technique; (3) mapping, by the source code understanding computer program, the two-dimensional image representation into a three-dimensional image representation; (4) determining, by the source code understanding computer program, a classification for the source code snippet using a deep learning network; and (5) providing, by the source code understanding computer program, the classification for the source code snippet to a downstream system.

20 Claims, 3 Drawing Sheets

(56) References Cited

U.S. PATENT DOCUMENTS

2021/0240453 A1* 8/2021 Badlani .................... G06F 8/42
2021/0248367 A1* 8/2021 Gal ...................... G06V 10/454

OTHER PUBLICATIONS

Keller, Patrick, et al; "What You See is What it Means! Semantic Representation Learning of Code based on Visualization and Transfer Learning", arxiv.org, Cornell University Library, 201 Olin Library Cornell University Ithaca, NY 14853, Feb. 7, 2020.

Puja, Amnot Saloni Alias, et al; "SnapCode—A Snapshot Based Approach to Code Stylometry",2019 International Conference on Information Technology (ICIT), IEEE, Dec. 19, 2019 (Dec. 19, 2019), pp. 337-341.

Rabin, MD Rafiqul Islam, et al; "Encoding Program as Image: Evaluating Visual Representation of Source Code", arxiv.org, Cornell University Library, 201 Olin Library Cornell University Ithaca, NY 14853, Nov. 1, 2021 (Nov. 1, 2021), p. 2, paragraph 2 p. 2, last paragraph—p. 4, paragraph 2; figure 1.

Shi, Rubio, et al; "CV4Code: Sourcecode Understanding via Visual Code Representations", arxiv.org, Cornell University Library, 201 Olin Library Cornell University Ithaca, NY 14853, May 11, 2022.

* cited by examiner

SYSTEMS AND METHODS FOR SOURCE CODE UNDERSTANDING USING SPATIAL REPRESENTATIONS

RELATED APPLICATIONS

This application claims priority to, and the benefit of, U.S. Provisional Patent Application 63/279,562, filed Nov. 15, 2021, the disclosure of which is hereby incorporated, by reference, in its entirety.

BACKGROUND OF THE INVENTION

1. Field of the Invention

Embodiments generally relate to systems and methods for source code understanding using spatial representations.

2. Description of the Related Art

Source code is often presented to machine learning algorithms for analysis. Typically, source code is either represented structurally as a syntax tree, or contextually, using sequence of characters or tokens.

SUMMARY OF THE INVENTION

Systems and methods for source code understanding using spatial representations are disclosed. According to one embodiment, a method for source code understanding using spatial representations may include: (1) receiving, by a source code understanding computer program, a source code snippet; (2) converting, by the source code understanding computer program, the source code snippet to a two-dimensional image representation using an encoding technique; (3) mapping, by the source code understanding computer program, the two-dimensional image representation into a three-dimensional image representation; (4) determining, by the source code understanding computer program, a discriminative task for the source code snippet using a deep learning network; and (5) providing, by the source code understanding computer program, the discriminative task for the source code snippet to a downstream system.

In one embodiment, the source code snippet is in a text format.

In one embodiment, the encoding technique comprises American Standard Code for Information Interchange (ASCII) encoding.

In one embodiment, the encoding technique comprises red-green-blue (RGB) formatting.

In one embodiment, the source code understanding computer program uses one-hot encoding to map the two-dimensional image representation into the three-dimensional image representation.

In one embodiment, the source code understanding computer program uses trainable embedding of arbitrary dimension to map the two-dimensional image representation into the three-dimensional image representation.

In one embodiment, the discriminative task is learning a problem that the source code snippet is trying to solve.

In one embodiment, the discriminative task is learning whether the source code snippet compiles.

In one embodiment, the discriminative task is learning a memory footprint for the source code snippet.

In one embodiment, the deep learning network comprises a deep convolutional neural network or a vision transformer.

According to another embodiment, a non-transitory computer readable storage medium may include instructions stored thereon, which when read and executed by one or more computer processors, cause the one or more computer processors to perform steps comprising: receiving a source code snippet; converting the source code snippet to a two-dimensional image representation using an encoding technique; mapping the two-dimensional image representation into a three-dimensional image representation; determining a discriminative task for the source code snippet using a deep learning network; and providing the discriminative task for the source code snippet to a downstream system.

In one embodiment, the source code snippet is in a text format.

In one embodiment, the encoding technique comprises American Standard Code for Information Interchange (ASCII) encoding.

In one embodiment, the encoding technique comprises red-green-blue (RGB) formatting.

In one embodiment, the two-dimensional image representation is mapped into the three-dimensional image representation using one-hot encoding.

In one embodiment, the two-dimensional image representation is mapped into the three-dimensional image representation using trainable embedding of arbitrary dimension.

In one embodiment, the discriminative task is learning a problem that the source code snippet is trying to solve.

In one embodiment, the discriminative task is learning whether the source code snippet compiles.

In one embodiment, the discriminative task is learning a memory footprint for the source code snippet.

In one embodiment, the deep learning network comprises a deep convolutional neural network or a vision transformer.

Embodiments may be directed to a supervised machine learning method for training deep learning networks, such as deep convolutional neural networks, vision transformer networks, etc., for source code understanding by treating source code snippets as two-dimensional (2D) images encoded using into a 2D grid-based using a format such as the American Standard Code for Information Interchange (ASCII) standard, Red-Green-Blue (RGB) format, unicode, etc.

A machine learning model may be trained to predict the problem that the source code is trying to solve. Embodiments may eliminate the need complex preprocessing pipelines for specific programming languages and can work with source code snippets that contain syntactic errors.

Embodiments may also include extracting a fixed-dimensional vector representation for a code snippet from intermediate layers of the network and may use the fixed-dimensional vector representation to compute a similarity score, in terms of the problem it is trying to solve, of a pair of source code snippets.

In one embodiment, the similarity score may be generalized to identify unseen problems at training time.

In one embodiment, the similarity score may be derived from source code snippet pairs that are trying to address problems that are unseen at training time.

Embodiments may use language adversarial training to adapt to data that has no particular task labels but their implementation programming language only to improve language independency of the system on unseen data.

According to another embodiment, a multi-task training method to learn a fixed-dimensional vector representation that captures general characteristics of source code is disclosed.

BRIEF DESCRIPTION OF THE DRAWINGS

In order to facilitate a fuller understanding of the present invention, reference is now made to the attached drawings. The drawings should not be construed as limiting the present invention but are intended only to illustrate different aspects and embodiments.

DETAILED DESCRIPTION OF PREFERRED EMBODIMENTS

Figure 1:
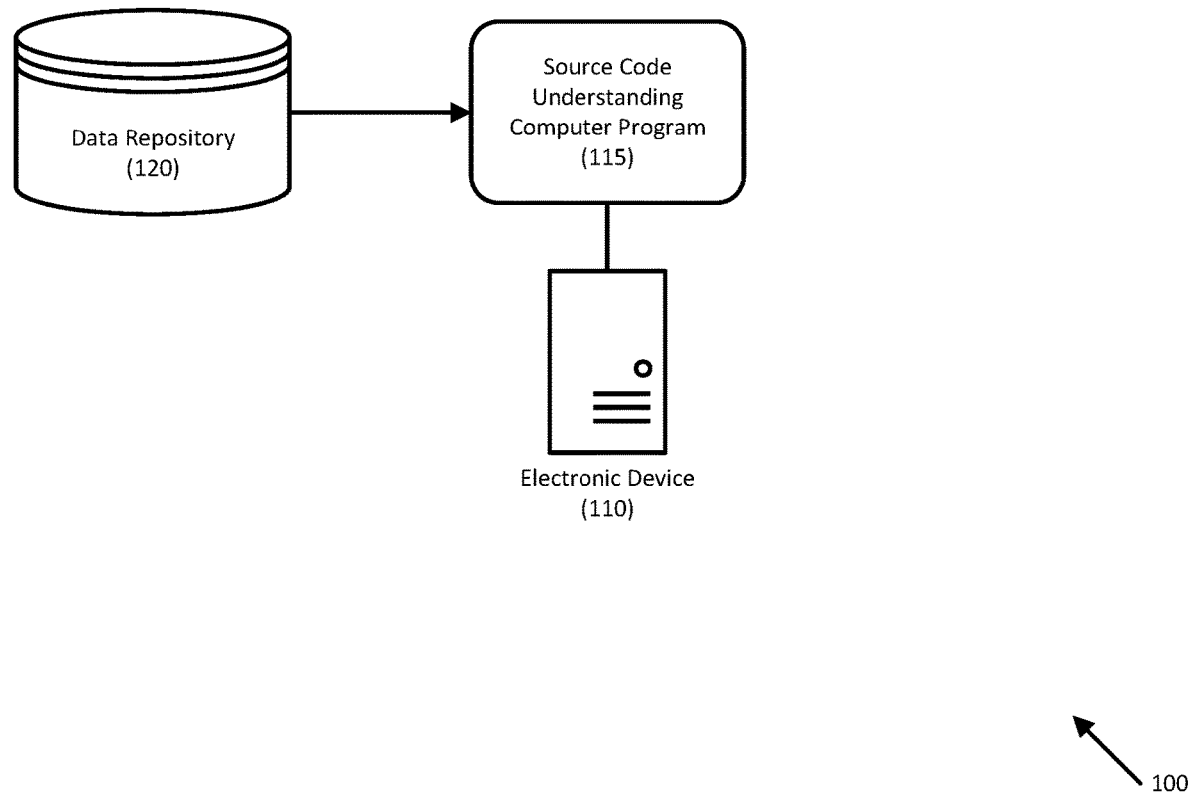
FIG. 1 depicts a system for source code understanding using spatial representations according to an embodiment.

Embodiments generally relate to systems and methods for source code (e.g., program) understanding using spatial representations, such as two-dimensional (2D) and three-dimensional (3D) images or representations. The task of source code understanding seeks to use machine learning to extract discriminative features, such as numerical vectors that represent the source code in a numerical form, from source code that can be used to solve a myriad of useful tasks, such as code search, code quality, etc.

Embodiments include a deep learning network, such as a deep convolutional neural network (CNN) or a vision transformer, that extracts the discriminative features directly from a compact image representation encoded with, for example, printable ASCII codepoint of the source code snippet. This unique two 2D image representation of the source code naturally encodes the structural and contextual information of the snippet. The structural and contextual information may be lost with other methods of source code representation, such as token-based representations. The deep learning network may extract learnt feature maps that are adapted to solve a particular task, such as predicting the language of the snippet, the problem that the snippet is solving, etc.

CNNs are naturally adapted to process this grid-like data and are a powerful machine learning model that can extract underlying spatial and structural relationships between important parts of the source code. This is in contrast to existing methods for source code program understanding, which generally treat the source code as a set of independent tokens, as an abstract syntax tree (AST), or as a sequential learning task.

Compared to CNNs, a standard Vision Transformer has much less inductive bias towards images. Other than the multi-layer perceptron (MLP) layers which are local and translationally equivariant, the power self-attention layers are global, which help the Vision Transformer models exploit contextual information that are spatially distant and global semantics. The Vision Transformer architecture may be combined with CNNs to introduce inductive bias thereby exploiting local two-dimensional structural information.

Embodiments may provide the following features: (1) source code snippets are treated as 2D images (e.g., a grid of numerical values), a CNN or vision transformer is used to extract discriminative features from the 2D image directly from this image; (2) the 2D image representations negate the need to create a grammar and parser for the language, so there is no need to extract abstract syntax trees (ASTs), thereby saving a significant amount of engineering work; (3) the 2D image representations do not compile, which is in contrast to feature extraction methods that rely on an AST extraction step which do not work with programs that have syntax errors; the model lends itself to interpretation and explainability, so that the learnt feature maps can be projected back onto the source code image to discover what parts of the snippet the model is "looking" at in the source code when it is solving a particular task; the 2D image representation is generic and language agnostic because there is no language-specific processing steps, which allows the model to be trained on multiple programming languages and be language independent.

Referring to FIG. 1, a system for source code understanding using spatial representations is disclosed according to an embodiment. System 100 may include electronic device 110, which may be any suitable electronic device, including servers (e.g., physical and/or cloud-based), computers (e.g., workstations, desktops, notebooks, tablets, etc.), smart devices, Internet of Things (IoT) appliances, etc. Electronic device 110 may execute source code understanding computer program 115, which may be a computer program, an application, a distributed application, etc.

Source code understanding computer program 115 may provide, for example, a deep learning network such as a deep convolutional neural network model, a vision transformer model, etc., and may receive a two-dimensional image representation of source code from source code in data repository 120. Source code understanding computer program 115 may predict the task that the source code performs, the problem that the source code solves, etc.

Figure 2:
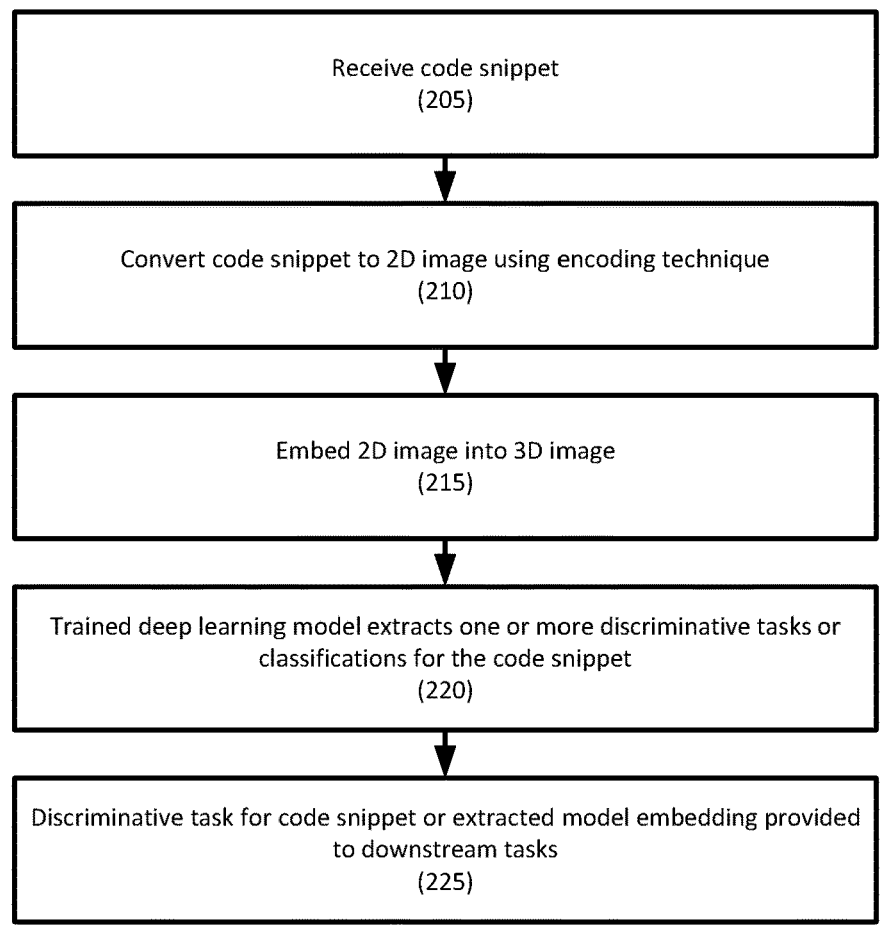
FIG. 2 depicts a method for source code understanding using spatial representations according to an embodiment.

Referring to FIG. 2, a method for source code understanding using spatial representations is disclosed according to an embodiment.

In step 205, a computer program, such as a source code understanding computer program, may retrieve a source code snippet from a code repository. The source code snippet may be in a text format, and may vary in size.

In step 210, the computer program may convert the source code snippet to a 2D image representation using an encoding technique, such as ASCII encoding, RGB formatting, etc. For example, while source code of most modern programming languages can be written in plain text from an extensive character set, only a small set of tokens and their composing characters have syntactic and semantic roles. The computer program may map each printable ASCII character to its unique index values, and may pad the special [blank] token wherever necessary to retain the rectangular shape of the output. The set of valid printable ASCII characters together with the special padding token $\mathbb{V}c$, | $\mathbb{V}c$|=96, includes of the following:

abcdefghijklmnopqrstuvwxyz
ABCDEFGHIJKLMNOPQRSTUVWXYZ
0123456789
!"#$%&' ( )*+,-./:;<=>?@[\]^'{ }|~
[space] [blank]

In one embodiment, for a code snippet spanning L lines each with $C_\iota$, $\iota \in 0, \ldots L-1$ characters, the transformation may be done by removing characters not within the valid set, resulting in $\hat{L}$ lines each with $\hat{C}_\iota$, $\iota \in 0, \ldots, \hat{L}-1$ characters, then by mapping each input character $v_k \in V_c$ to its index value k, and then padding each line to $M = \max_{\iota=0}^{\hat{L}-1} \hat{C}_\iota$ long with the index value of [blank], generate the output 2-dimensional code matrix $X \in \mathbb{V}^{\hat{L} \times M}$.

In one embodiment, minimum and maximum sizes for the 2D image representations may be specified.

In embodiments, RGB or greyscale images may have pixel values (e.g., continuous intensity) and may be taken as inputs to the deep learning network directly.

In step 215, the computer program may map the 2D image representation into a 3D image representation. For example, one hot encoding may be used to transform each pixel in the code image to a vector of fixed dimension equal to the size of the set of valid characters, i.e., $X \in \mathbb{V}^{L \times M} \rightarrow \hat{X} \in X \in \mathbb{V}^{L \times M \times |Vc|}$. Other techniques, such as trainable embedding of arbitrary dimension, may also be used as is necessary and/or desired.

In step 220, the computer program may use a trained deep learning network, such as a CNN model or a vision transformer, to extract a discriminative task, such as learning the problem that the code snippet is trying to solve, or a classification for the code snippet. For example, the deep learning network may be trained in a supervised manner for arbitrary downstream task and a bottleneck layer may be used to extract fixed-dimensional embedding for any input source code snippet. Embodiments may include a backbone of multiple convolution blocks with skip connections. Furthermore, a 3×3 convolution with a stride step 1×1 may be used in the initial convolution and no pooling operation is performed in order to retain the contextual details. The number of feature maps in each residual block may be increased while keeping the stride size constant throughout as 1×1. After the residual blocks, max spatial pyramid pooling may be used to pool features from sub-regions and generate a vector of fixed length for input source code of arbitrary size. This is then connected through a bottleneck fully connected layer constrained number of output units.

Other discriminative tasks, such as determining whether the program compiles, learning the memory footprint of the code snippet, etc. may be learned as is necessary and/or desired.

In step 225, the computer program may provide the discriminative task or classification to a downstream task. For example, in one embodiment, the classification of the code snippet may be provided to learned downstream tasks.

In one embodiment, when the downstream task is the same as one of the discriminative tasks used for training, such as predicting the memory footprint of a function, then the classification result can be directly used by the downstream task.

In another embodiment, when the downstream task is not one of the discriminative tasks used for training, the latent feature from the deep learning network may be used as feature. For example, a downstream task classification or regression head may be conditioned on the bottleneck output.

In another embodiment, the classification head may be replaced with a new classification head, and the deep learning network may be finetuned for a downstream task.

In another embodiment, the extraction of the model embedding may be provided to downstream tasks.

In one embodiment, the learned neural network may be 1) used for classification among the known programming problems; 2) extract a fixed-dimension latent feature from the neural network for similarity scoring between any pair of code samples. For example, downstream task classification or regression head may be conditioned on the bottleneck output.

Embodiments may classify the source code snippet based on their respective programming problem. Each separate programming problem may be treated as a separate class and a code sample submitted to a problem belongs to that class. Code samples belonging to the same programming problem will have high structural and semantic information overlap.

Embodiments may also identify the efficacy of the various source code representations for downstream tasks, such as identifying similar code samples.

Figure 3:
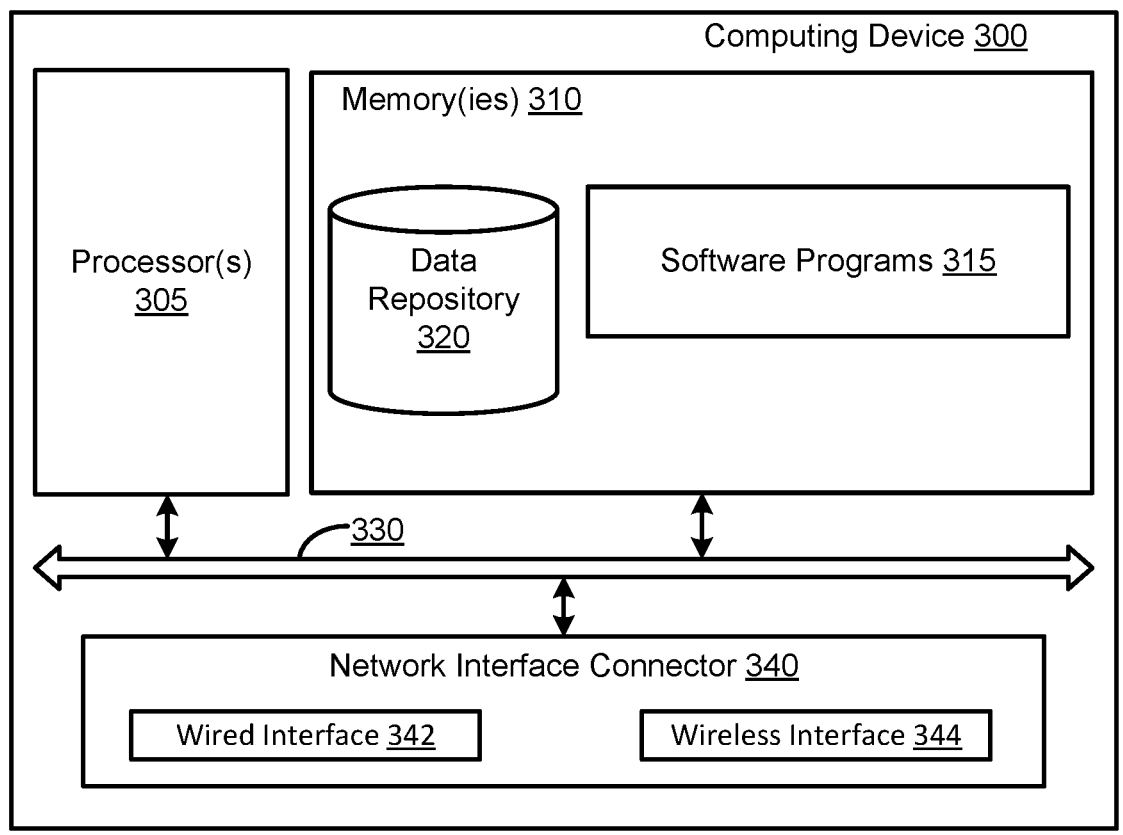
FIG. 3 depicts an exemplary computing system for implementing aspects of the present disclosure.

FIG. 3 depicts an exemplary computing system for implementing aspects of the present disclosure. FIG. 3 depicts exemplary computing device 300. Computing device 300 may represent the system components described herein. Computing device 300 may include processor 305 that may be coupled to memory 310. Memory 310 may include volatile memory. Processor 305 may execute computer-executable program code stored in memory 310, such as software programs 315. Software programs 315 may include one or more of the logical steps disclosed herein as a programmatic instruction, which may be executed by processor 305. Memory 310 may also include data repository 320, which may be nonvolatile memory for data persistence. Processor 305 and memory 310 may be coupled by bus 330. Bus 330 may also be coupled to one or more network interface connectors 340, such as wired network interface 342 or wireless network interface 344. Computing device 300 may also have user interface components, such as a screen for displaying graphical user interfaces and receiving input from the user, a mouse, a keyboard and/or other input/output components (not shown).

Although several embodiments have been disclosed, it should be recognized that these embodiments are not exclusive to each other, and features from one embodiment may be used with others.

Hereinafter, general aspects of implementation of the systems and methods of embodiments will be described.

Embodiments of the system or portions of the system may be in the form of a "processing machine," such as a general-purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

In one embodiment, the processing machine may be a cloud-based processing machine, a physical processing machine, or combinations thereof.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement embodiments may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA (Field-Programmable Gate Array), PLD (Programmable Logic Device), PLA (Programmable Logic Array), or PAL (Programmable Array Logic), or any other device or arrangement of devices that is capable of implementing the steps of the processes disclosed herein.

The processing machine used to implement embodiments may utilize a suitable operating system.

It is appreciated that in order to practice the method of the embodiments as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above, in accordance with a further embodiment, may be performed by a single component. Further, the processing performed by one distinct component as described above may be performed by two distinct components.

In a similar manner, the memory storage performed by two distinct memory portions as described above, in accordance with a further embodiment, may be performed by a single memory portion. Further, the memory storage performed by one distinct memory portion as described above may be performed by two memory portions.

Further, various technologies may be used to provide communication between the various processors and/or memories, as well as to allow the processors and/or the memories to communicate with any other entity; i.e., so as to obtain further instructions or to access and use remote memory stores, for example. Such technologies used to provide such communication might include a network, the Internet, Intranet, Extranet, a LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of embodiments. The set of instructions may be in the form of a program or software. The software may be in the form of system software or application software, for example. The software might also be in the form of a collection of separate programs, a program module within a larger program, or a portion of a program module, for example. The software used might also include modular programming in the form of object-oriented programming. The software tells the processing machine what to do with the data being processed.

Further, it is appreciated that the instructions or set of instructions used in the implementation and operation of embodiments may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments. Also, the instructions and/or data used in the practice of embodiments may utilize any compression or encryption technique or algorithm, as may be desired. An encryption module might be used to encrypt data. Further, files or other data may be decrypted using a suitable decryption module, for example.

As described above, the embodiments may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in embodiments may take on any of a variety of physical forms or transmissions, for example. Illustratively, the medium may be in the form of a compact disc, a DVD, an integrated circuit, a hard disk, a floppy disk, an optical disc, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors.

Further, the memory or memories used in the processing machine that implements embodiments may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the systems and methods, a variety of "user interfaces" may be utilized to allow a user to interface with the processing machine or machines that are used to implement embodiments. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method, it is not necessary that a human user actually interact with a user interface used by the processing machine. Rather, it is also contemplated that the user interface might interact, i.e., convey and receive information, with another processing machine, rather than a human user. Accordingly, the other processing machine might be characterized as a user. Further, it is contemplated that a user interface utilized in the system and method may interact partially with another processing machine or processing machines, while also interacting partially with a human user.

It will be readily understood by those persons skilled in the art that embodiments are susceptible to broad utility and application. Many embodiments and adaptations of the present invention other than those herein described, as well as many variations, modifications and equivalent arrangements, will be apparent from or reasonably suggested by the foregoing description thereof, without departing from the substance or scope.

Accordingly, while the embodiments of the present invention have been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for source code understanding using spatial representations, comprising:
   receiving, by a source code understanding computer program, a source code snippet;
   converting, by the source code understanding computer program, the source code snippet to a matrix representation using an encoding technique, wherein the matrix representation encodes structural and contextual information of the source code snippet;
   encoding, by the source code understanding computer program, the matrix representation into a three-dimensional image representation using one hot encoding or trainable embeddings;
   determining, by the source code understanding computer program, a discriminative task for the source code snippet using a deep learning network; and
   providing, by the source code understanding computer program, the discriminative task for the source code snippet to a downstream system.

2. The method of claim 1, wherein the source code snippet is in a text format.

3. The method of claim 1, wherein the encoding technique comprises American Standard Code for Information Interchange (ASCII) encoding.

4. The method of claim 1, wherein the encoding technique comprises red-green-blue (RGB) formatting.

5. The method of claim 1, wherein the source code understanding computer program uses one-hot encoding to encode the matrix representation into the three-dimensional image representation.

6. The method of claim 1, wherein the source code understanding computer program uses trainable embedding of arbitrary dimension to encode the matrix representation into the three-dimensional image representation.

7. The method of claim 1, wherein the discriminative task is learning a problem that the source code snippet is trying to solve.

8. The method of claim 1, wherein the discriminative task is learning whether the source code snippet compiles.

9. The method of claim 1, wherein the discriminative task is learning a memory footprint for the source code snippet.

10. The method of claim 1, wherein the deep learning network comprises a deep convolutional neural network or a vision transformer.

11. A non-transitory computer readable storage medium, including instructions stored thereon, which when read and executed by one or more computer processors, cause the one or more computer processors to perform steps comprising:
    receiving a source code snippet;
    converting the source code snippet to a matrix representation using an encoding technique;
    encoding the matrix representation into a three-dimensional image representation;
    determining a discriminative task for the source code snippet using a deep learning network; and
    providing the discriminative task for the source code snippet to a downstream system.

12. The non-transitory computer readable storage medium of claim 11, wherein the source code snippet is in a text format.

13. The non-transitory computer readable storage medium of claim 11, wherein the encoding technique comprises American Standard Code for Information Interchange (ASCII) encoding.

14. The non-transitory computer readable storage medium of claim 11, wherein the encoding technique comprises red-green-blue (RGB) formatting.

15. The non-transitory computer readable storage medium of claim 11, wherein the matrix representation is encoded into the three-dimensional image representation using one-hot encoding.

16. The non-transitory computer readable storage medium of claim 11, wherein the matrix representation is encoded into the three-dimensional image representation using trainable embedding of arbitrary dimension.

17. The non-transitory computer readable storage medium of claim 11, wherein the discriminative task is learning a problem that the source code snippet is trying to solve.

18. The non-transitory computer readable storage medium of claim 11, wherein the discriminative task is learning whether the source code snippet compiles.

19. The non-transitory computer readable storage medium of claim 11, wherein the discriminative task is learning a memory footprint for the source code snippet.

20. The non-transitory computer readable storage medium of claim 11, wherein the deep learning network comprises a deep convolutional neural network or a vision transformer.

* * * * *